No. 762,014. PATENTED JUNE 7, 1904.
L. WITTBOLD.
APPARATUS FOR SPRAYING PLANTS.
APPLICATION FILED OCT. 5, 1903.
NO MODEL.
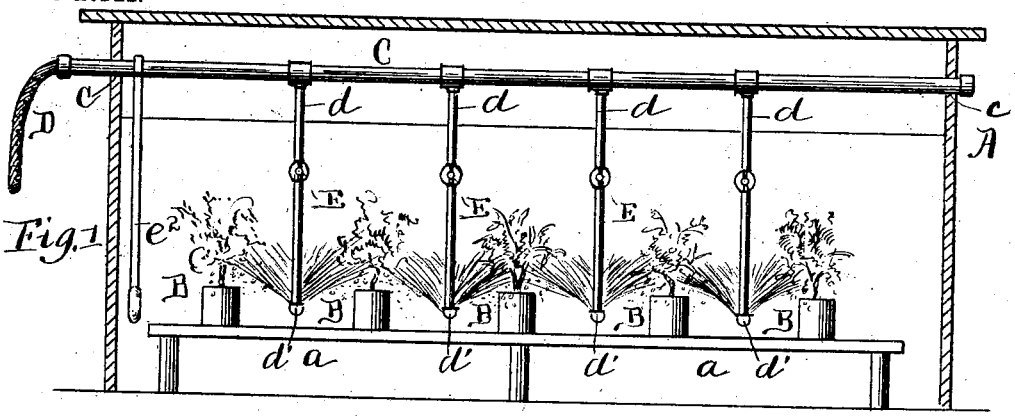
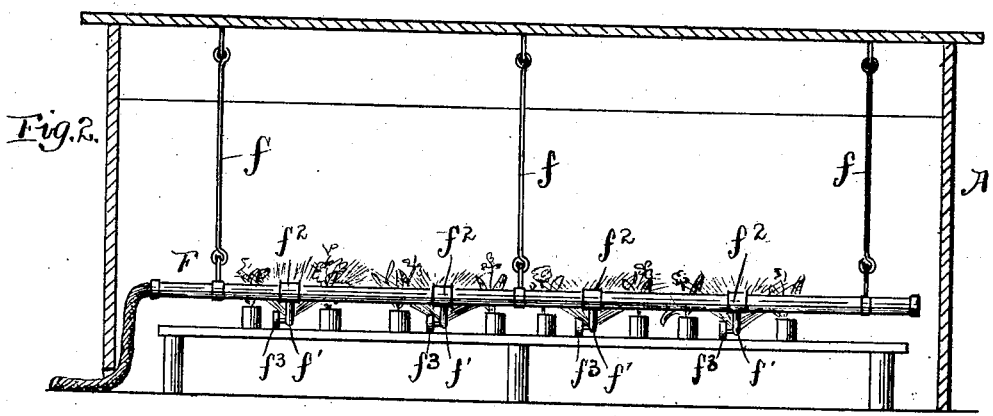
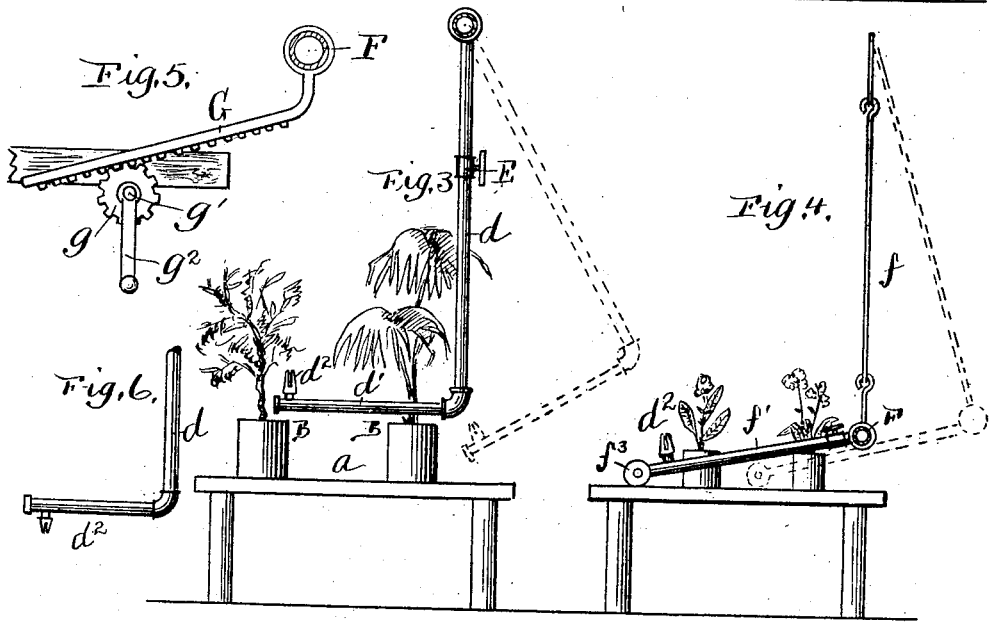
Witnesses
Samuel W. Banning
Walker Banning
Inventor
Louis Wittbold
By Banning & Banning
Attys No. 762,014. Patented June 7, 1904.

UNITED STATES PATENT OFFICE.

LOUIS WITTBOLD, OF CHICAGO, ILLINOIS.

APPARATUS FOR SPRAYING PLANTS.

SPECIFICATION forming part of Letters Patent No. 762,014, dated June 7, 1904.

Application filed October 5, 1903. Serial No. 175,827. (No model.)

*To all whom it may concern:*

Be it known that I, LOUIS WITTBOLD, a citizen of the United States, residing at Chicago, in the county of Cook and State of Illinois, have invented certain new and useful Improvements in Apparatus for Spraying Plants, of which the following is a specification.

This invention is intended for use in greenhouses or other places fitted for the growing of plants in which it is desirable to spray a large number of plants simultaneously and quickly and at the same time give a more uniform wetting action than is possible where each plant is sprayed individually by hand.

The apparatus further relates to the arrangement of pipes within the greenhouse and to the means by which their simultaneous operation is effected; and the invention finally consists in the features of construction and combination of parts hereinafter described and claimed.

In the drawings illustrating the invention, Figure 1 is a longitudinal sectional elevation of a greenhouse, showing the arrangement of pipes preferably employed in the spraying of large plants; Fig. 2, a similar view showing the arrangement of pipes preferably employed in the spraying of small plants; Fig. 3, a cross-sectional view of the pipe arrangement of Fig. 1; Fig. 4, a similar view of the pipe arrangement of Fig. 2; Fig. 5, a device for manipulating the pipe of Fig. 4, and Fig. 6 a modification of the discharge-pipe.

As shown, this invention is employed in a greenhouse A of any suitable shape or style of construction, in which the plants are arranged upon benches $a$, extending longitudinally of the greenhouse, and in Fig. 1 a series of large plants B are shown arranged in pots or jars a suitable distance from one another to allow of the spraying operation, and, as shown in Fig. 3, two or more rows of plants can be arranged upon the same bench, having the plants arranged one behind another to leave a straight aisle or channel between the plants for the manipulation of the spraying apparatus of this invention. It is ordinarily desirable to spray the plants from beneath, for the reason that a more uniform and thorough watering or spraying is thereby obtained and for the further reason that a stream of water directed against the under surfaces of the leaves washes away worms or insects which ordinarily collect at this point and which it is impossible to spray by a hose or hand-sprinkler. Where the plants to be sprayed are of considerable size or where it is desirable to direct a stream of water downwardly thereon, the pipe arrangement of Fig. 1 is employed, in which C represents a header-pipe extending longitudinally of the greenhouse and journaled at the points $c\,c$ to oscillate, and into the header-pipe is inserted a suitable hose D, which may be connected with the city main or other suitable source of water-supply. At suitable points along the header-pipe are arranged branch pipes $d$, which are fixedly inserted into the header-pipe and adapted to swing or rock therewith, and said branch pipes are properly spaced to swing between the rows of plants on the bench beneath and spray the adjacent rows of plants when the header-pipe is rocked or oscillated. Each of the branch pipes terminates in a discharge-pipe $d'$ at right angles to the branch pipe and provided on its end with a nozzle $d^2$, adapted to discharge a fan-shaped sheet of water in a plane parallel to the header-pipe, and the head of water employed should be of sufficient strength, so that the spray from adjoining branch pipes will unite in a continuous sheet extending the entire length of the bench, as shown in Fig. 1. The several branch pipes are provided with valves E for admitting water to the nozzles. At a convenient point in the header-pipe is a lever $e^2$, fixedly attached to the header, which enables the same to be rocked or oscillated, thereby swinging the branch pipes transversely of the bench and down the rows or aisles, as shown by dotted lines in Fig. 3. By this method the entire number of plants are watered at a single turn of the header-pipe, and the water is driven up beneath the leaves of the plants to remove bugs or insects which may have collected thereon. Where it is desirable to water the plants from above, the nozzle $d^2$ can be arranged beneath the discharge-pipe, as in Fig. 6, and the branch pipe shortened to raise the discharge-pipe above the tops of the plants, thereby allowing the sheet of water to be directed down rather than up against the plants.

In cases where the plants are small the apparatus of Fig. 1 would not be suitable, for the reason that when the discharge-pipes are swung back and forth the nozzle will be raised at one point more than another by reason of the swing of the pipe, as shown in Fig. 3, and where this is the case the pipe arrangement of Fig. 2 will be found more advantageous. In this case a header-pipe F is employed, which is supended from the top of the greenhouse by means of linked rods $f$ or other suitable means at a point slightly above the bench upon which the plants are arranged and in a line parallel therewith, and said header-pipe is provided with a series of discharge-pipes $f'$, connected with the header-pipe by means of swivel-joints $f^2$, which allow the discharge-pipes to be moved or swung with respect to the header-pipe without allowing the escape of water therefrom. On the end of the discharge-pipes are arranged upwardly-projecting nozzles $d^2$ similar to those hitherto described, and each discharge-pipe $f'$ is provided on its end with a wheel or roller $f^3$, which is adapted to travel back and forth over the surface of the bench and between the rows of plants thereon, constantly maintaining the nozzle at the same height above the bench regardless of the position of the header-pipe or of the angle between the header-pipe and the discharge-pipes. In this way the sheet of water from the nozzles will be at the same height across the entire width of the bench, which enables the device to be used with small plants which cannot be treated by the appliance of Fig. 1. The header-pipe of Fig. 2 can be operated by hand or by means of a rack or other suitable mechanism, as shown in Fig. 5, in which G represents one of the series of rack-bars attached to the header-pipe F and extending backwardly therefrom at suitable intervals and adapted to be operated by means of a series of pinions $g$, arranged upon a longitudinally-extending shaft $g'$, suitably journaled beneath the bench upon which the flowers are located and adapted to be rotated by means of a handle $g^2$ to simultaneously move the rack-bars and swing the header-pipe to and from the bench. It is plain, however, that other suitable means of effecting this result may be employed without in any way changing the character of the invention.

From the foregoing description it will be plain that a continuous sheet of water of a considerable length can be moved across a bench of plants at a single operation and a large number of plants sprayed at a point where the water will produce the most beneficial results, and in addition to the saving of time and labor the operation can be performed at a point where there will be no danger to the operator of wetting himself during the spraying operation, all of which are features of great importance in the cultivation of plants.

Although the invention has been described with considerable particularity, it is plain that some of the features may be changed or varied without departing from the spirit of the invention.

What I regard as new, and desire to secure by Letters Patent, is—

1. In an apparatus for spraying plants in a greenhouse, the combination of a header-pipe extending longitudinally of the greenhouse and supported from the roof thereof, a series of discharge-pipes connected with the header-pipe and adapted to travel between the plants and having simultaneous movement imparted thereto by the movement of the header-pipe, and a series of nozzles on the discharge-pipes for projecting water transversely of the discharge-pipes for watering the plants adjacent thereto, substantially as described.

2. In a device for spraying plants in a greenhouse, the combination of a header-pipe supported within the greenhouse, a series of discharging-pipes in angular relation to the header-pipe and extending between the rows of plants within the greenhouse and adapted to be moved in a direction transverse to the header-pipe by the movement of the header-pipe, and a series of nozzles on the discharge-pipes adapted to project water in a sheet transversely of the discharge-pipes for watering the plants adjacent thereto, substantially as described.

3. In a device for spraying plants, the combination of a bench of plants, the header-pipe journaled in parallel position to and above a bench of plants, a branch pipe depending from the header-pipe and fixedly attached thereto and adapted to swing therewith, a discharge-pipe in angular relation to the branch pipe and adapted to swing transversely of the bench of plants, and a nozzle on the branch pipe adapted to discharge a sheet of water in transverse relation to the discharge-pipe, substantially as described.

4. In a device for spraying plants, the combination of a bench of plants, the header-pipe supported in a position to swing above a bench of plants and in parallel relation thereto, a discharge-pipe in angular relation to the header-pipe and adapted to swing with respect thereto to have its end supported by the bench regardless of the swing of the header-pipe, and a nozzle on the discharge-pipe adapted to discharge water transversely of the discharge-pipe and in parallel relation with the bench, substantially as described.

5. In a device for spraying plants, the combination of a bench of plants, the header-pipe adapted to be hung in parallel relation to and above a bench of plants, a series of discharge-pipes connected with the header-pipe adapted to swing with respect thereto and have their free ends supported by the bench, and a series of nozzles on the discharge-pipes adapted to discharge water transversely of the discharge-pipe, substantially as described.

6. In a device for spraying plants, the combination of a bench of plants, the header-pipe adapted to be hung in parallel relation to and above a bench of plants, a series of discharge-pipes connected with the header-pipe adapted to swing with respect thereto and have their free ends supported by the bench, a series of nozzles on the discharge-pipes adapted to discharge water transversely of the discharge-pipes, and a series of wheels on the ends of the discharge-pipes for allowing the same to be moved back and forth transversely of the bench with the movement of the header-pipe, substantially as described.

LOUIS WITTBOLD.

Witnesses:
SAMUEL W. BANNING,
WALKER BANNING.